US008036907B2

(12) United States Patent
Davies et al.

(10) Patent No.: US 8,036,907 B2
(45) Date of Patent: Oct. 11, 2011

(54) METHOD AND SYSTEM FOR LINKING BUSINESS ENTITIES USING UNIQUE IDENTIFIERS (75) Inventors: Robin Davies, Bethlehem, PA (US); Sandra Stoker, Bethlehem, PA (US)

(73) Assignee: The Dun & Bradstreet Corporation, Short Hills, NJ (US)

( * ) Notice: Subject to any disclaimer, the term of this patent is extended or adjusted under 35 U.S.C. 154(b) by 1479 days.

(21) Appl. No.: 10/744,603

(22) Filed: Dec. 23, 2003

(65) Prior Publication Data

US 2005/0137899 A1 Jun. 23, 2005

(51) Int. Cl.
*G06Q 10/00* (2006.01)
*G06F 17/30* (2006.01)
*G06F 7/60* (2006.01)

(52) U.S. Cl. ........... 705/1.1; 705/27; 707/758; 707/707; 707/736; 707/100; 707/5; 703/2

(58) Field of Classification Search .................. None
See application file for complete search history.

(56) References Cited

U.S. PATENT DOCUMENTS

| | | | | |
|---|---|---|---|---|
| 5,404,505 A * | 4/1995 | Levinson | | 707/10 |
| 5,749,735 A * | 5/1998 | Redford et al. | | 434/307 R |
| 5,802,326 A * | 9/1998 | Becker et al. | | 715/854 |
| 5,890,140 A * | 3/1999 | Clark et al. | | 705/35 |
| 6,487,469 B1 * | 11/2002 | Formenti | | 700/97 |
| 6,523,041 B1 * | 2/2003 | Morgan et al. | | 707/102 |
| 6,912,591 B2 * | 6/2005 | Lash | | 709/246 |
| 6,954,749 B2 * | 10/2005 | Greenblatt et al. | | 707/4 |
| 7,120,690 B1 * | 10/2006 | Krishnan et al. | | 709/225 |
| 7,392,255 B1 * | 6/2008 | Sholtis et al. | | 1/1 |
| 7,756,735 B2 * | 7/2010 | Sessions et al. | | 705/7.11 |
| 7,822,757 B2 * | 10/2010 | Stoker et al. | | 707/758 |
| 2002/0161778 A1 * | 10/2002 | Linstedt | | 707/102 |
| 2003/0061232 A1 * | 3/2003 | Patterson | | 707/104.1 |
| 2003/0093429 A1 | 5/2003 | Nishikawa et al. | | |
| 2003/0120528 A1 | 6/2003 | Kruk et al. | | |
| 2003/0225604 A1 | 12/2003 | Casati et al. | | |
| 2005/0137899 A1 * | 6/2005 | Davies et al. | | 705/1 |
| 2007/0156677 A1 * | 7/2007 | Szabo | | 707/5 |
| 2008/0126035 A1 * | 5/2008 | Sessions et al. | | 703/2 |

FOREIGN PATENT DOCUMENTS

JP 200385044 9/2001
JP 200322351 1/2003

OTHER PUBLICATIONS

"Dunn & Bradstreet accelerates its data universe"; Radding, Alan. InfoWorld. San Mateo: Jul. 11, 1994. vol. 16 Iss. 28; p. 66, 1 pgs, (attached as PDF, herein known as Ref "B&D").*
Sharing persistent object-bases in a workstation environment; by Widjojo, Surjatini, Ph.D, University of Southern Califonia, 1990.*

(Continued)

*Primary Examiner* — Matthew Brooks
(74) *Attorney, Agent, or Firm* — Ohlandt, Greeley, Ruggiero & Perle, LLP (57) ABSTRACT

A corporate linkage system and method provides customers with complete, accurate, and timely lists of corporate linkage locations, including monitoring company lists for changes to location lists, matching stored locations to a company or third party list of locations, providing detailed coding on matches, and batch updates to global files.

3 Claims, 9 Drawing Sheets

OTHER PUBLICATIONS

Privately-held company directories; Marydee Ojala. Online. Medford: Mar./Apr. 1999. vol. 23, Iss. 2; p. 81, 3 pages.*

D&B bundles access software with customized GTE browzer. (Jul. 1998). Link—up, 15(4), 29. Retrieved Mar. 1, 2009, from ABI/INFORM Global database. (Document ID: 32064234).*

Dun & Bradstreet Introduces D&B Family Tree Finder; Web-Based Tool Identifies Business Relationships To Manage Client Conflicts Business/Technology Editors. Business Wire. New York: May 23, 2000. pg. 1.*

O'Leary, Mick. (Dec. 1990). New(sNet) Channel to D&B Company Data. Information Today, 7(11), 11.*

Finding corporate relationships online Ojala, Marydee. Database. Weston: Aug. 1993. vol. 16, Iss. 4; p. 80, 4 pgs.*

Dun & Bradstreet Expands eUpdate Initiative; Web-Based Program Enhanced to Allow Companies to Update Additional Information for a More Current and Accurate D&B Database Business & Technology Editors. Business Wire. New York: Jun. 7, 2000. pg. 1.*

At Dun & Bradstreet, Refreshments Now Come One Million Times a Day; Business Information Leader Provides Continuous Updates to World's Largest Database Business Editors & Technology Writers. Business Wire. New York: Sep. 21, 1999. pg. 1.*

Database updates: Business & finance. (Jan. 1993). Online, 17(1), 67. Retrieved Apr. 13, 2010, from ABI/INFORM Global. (Document ID: 702559).*

D&B Will Start New Service the Data Giant Will Allow Clients to Update Their Own Company Profiles.; [Second Edition] Mariella Savidge, The Morning Call. Morning Call. Allentown, Pa.: Apr. 29, 2000. p. B.24.*

Dun & Bradstreet and Deloitte Consulting announce a global agreement to deliver optimized information Canada NewsWire. Ottawa: Feb. 15, 2000. p. 1.*

D&B's Widely Used Numbering System Gives Firm a Big Marketing Advantage Wall Street Journal. (Eastern edition). New York, N.Y.: Oct. 5, 1989. p. 1.*

A clash of titans: Comparing America's most comprehensive business directories Michael R Lavin. Database. Weston: Jun./Jul. 1998. vol. 21, Iss. 3; p. 44, 5 pgs.*

Dow Jones Interactive To Offer An Extensive Array of Dun & Bradstreet Information Business Editors. Business Wire. New York: Feb. 20, 1998. p. 1.*

The list of lists Cobb, Robin. Marketing. London: Jul. 21, 1994. p. 23, 3 pgs.*

"WorldBase, Global Database and 2001 Enhancements"; Dun & Bradstreet, Inc.; Aug. 2001.*

Captured Images from the "wayback machine" attaches and labeled W, 1-4.*

"WorldBase Linkage Locator, Key business information on U.S. and globally-linked businesses," Sales and Marketing Solutions, 2003 Dun&Bradstreet, Inc.

"D&B WorldBase Global Corporate Linkage, Maximize your profit opportunities with global corporate family information," 1998 Dun & Bradstreet, Inc.

"D&B WorldBase Global Corporate Linkage, Your Window to 1.3 Million Global Corporate Familie with More than 5.7 Family Members," 1998 Dun & Bradstreet, Inc.

{tc "D&B WorldBase Global Marketing Information"} D & B WorldBase Global Marketing Information, Locate your most qualified sales prospects worldwide with targeted marketing information, 1998 Dun & Bradstreet, Inc.

"D&B WorldBase Online, Gain instant access to information on over 50 million businesses around the world directly from your PC," 1998 Dun & Bradstreet, Inc.

"D&B WorldBase Online," 2001 Dun & Bradstreet, Inc.

"WorldBase, Global Database and 2001 Enhancements," Dun & Bradstreet, Inc., Aug. 2001.

Notice of Preliminary Rejection corresponding to Korean Patent Application No. 1020067012632 dated Mar. 29, 2011.

Search Report corresponding to Hungarian Patent Application No. 2009019365 dated May 13, 2010.

JP Patent Application No. 2006-547514—Official Letter dated Apr. 1, 2010—English Translation of the Reason for Rejection.

Radding, A., "Dun & Bradstreet accelerates its data universe," InfoWorld, San Mateo, vol. 16, Iss. 28, p. 66, 1994.

Watanabe, E., "XML-based B2B Systems," $1^{st}$ Ed., Ohmsha, Ltd., Apr. 25, 2000, pp. 25-264.

Dun & Bradstreet Introduces D&B Family Tree Finder, [online], Information Today, vol. 17, Issue 7, Jul./Aug. 2000, 3pp.

* cited by examiner

METHOD AND SYSTEM FOR LINKING BUSINESS ENTITIES USING UNIQUE IDENTIFIERS

BACKGROUND OF THE INVENTION

1. Field of the Invention

The present disclosure generally relates to business information services. In particular, the present disclosure relates to corporate families, business information, linkage, multinational corporations, business intelligence, global data collection, and other fields.

2. Background of the Invention

Some providers of corporate linkage information provide incomplete, inaccurate, and outdated information. Often, data comes only from annual reports or is updated quarterly. Fragmented and uncoordinated update processes drive quality down and costs up. The conventional one-record-at-a-time approach to maintenance has reduced effectiveness. For example, local updates that are uncoordinated with global updates can introduce inconsistencies and errors. There is a need for a provider to pro-actively seek out changes in corporate linkage information and provide complete, accurate and timely information.

There is a need for monitoring for changes in company locations. New and closed locations need to be identified and added to stored data without the expense of telephone calls. This would provide more complete and accurate lists of corporate linkage so that customers are able to identify newly opened location sooner for better account penetration and not waste efforts on locations that are no longer operating.

There is a need for updating stored information with information from companies themselves as well as third parties through a matching process. This would reduce the time and effort needed to make these comparisons and improve the consistency and accuracy of the comparisons. There is a need to automate manual processes to enable them to be repeated periodically and to implement a monitoring process to identify changes. This would provide more complete and accurate corporate linkages. Stored data would be confirmable, ensuring the accuracy of name and address for locations and providing investigation for unmatched records. Coded match results would allow determination of missing and duplicate locations. This would provide more accurate and complete corporate linkage.

There is a need for batch updates to global files to ensure data is updated correctly and consistently. This would eliminate data entry mistakes and increase speed of updates. This would provide more complete corporate linkage.

SUMMARY OF THE INVENTION

The present disclosure is directed to methods and systems for linking legal entities that satisfy these and other needs.

One aspect is a method of linking business entities. A general linking update is performed for a family tree periodically. The family tree is monitored for changes in branch locations periodically and linking is updated for any change in branch locations. Linking is updated for a corporate change, upon notice of a corporate change. In some embodiments, the family tree has a multi-tiered hierarchy, including an ultimate parent, at least one subsidiary and at least one branch. The family tree includes at least one one-up relationship. In some embodiments, any linking update is made so that local and global information are consistent. In some embodiments, at least a portion of sources for any updates are coordinated by a central coordinator and gathered from regional coordinators. In some embodiments, the general linking update is performed at least annually. In some embodiments, the general linking update is performed for the family tree, only if it is a top tree. In some embodiments, updating the branch locations is performed prior to a scheduled release of data products. In some embodiments, any linking update for branch locations is performed by an automated batch update process. In some embodiments, the linking for the corporate change is performed within a month of the notice.

Another aspect is a system for linking business entities including a matching component, at least one linkage update component, a linkage database, a global repository, and at least one fabrication component. The matching component assigns unique corporate identifiers to entities in family trees. The linkage update component performs linking updates on the family trees. The linkage database stores global trees. The global repository stores global trees. The fabrication component fabricates a data product incorporating linkage data. In some embodiments, the system also includes an application database having data that is processed for a particular application. In some embodiments, the system also includes a data cleansing component for processing a piece of collected data prior to storage in the application database. In some embodiments, the system also includes a specialized update component for performing a batch update automatically in the global repository. In some embodiments, the system also includes a validation component for performing validation on the family trees in the linkage database.

Another aspect is a machine-readable medium having instructions stored thereon to perform a method of linking business entities. A general linking update is performed for a family tree periodically. The family tree is monitored for changes in branch locations periodically and linking is updated for any change in branch locations. Linking is updated for a corporate change, upon notice of the corporate change. In some embodiments, the linking for the corporate change is automatically cascaded through a particular family tree, when that family tree is involved in a merger or acquisition.

BRIEF DESCRIPTION OF THE DRAWINGS

These and other features, aspects, and advantages of the present disclosure will become better understood with reference to the following description, appended claims, and drawings where:

DETAILED DESCRIPTION OF THE PREFERRED EMBODIMENTS

Figure 1:
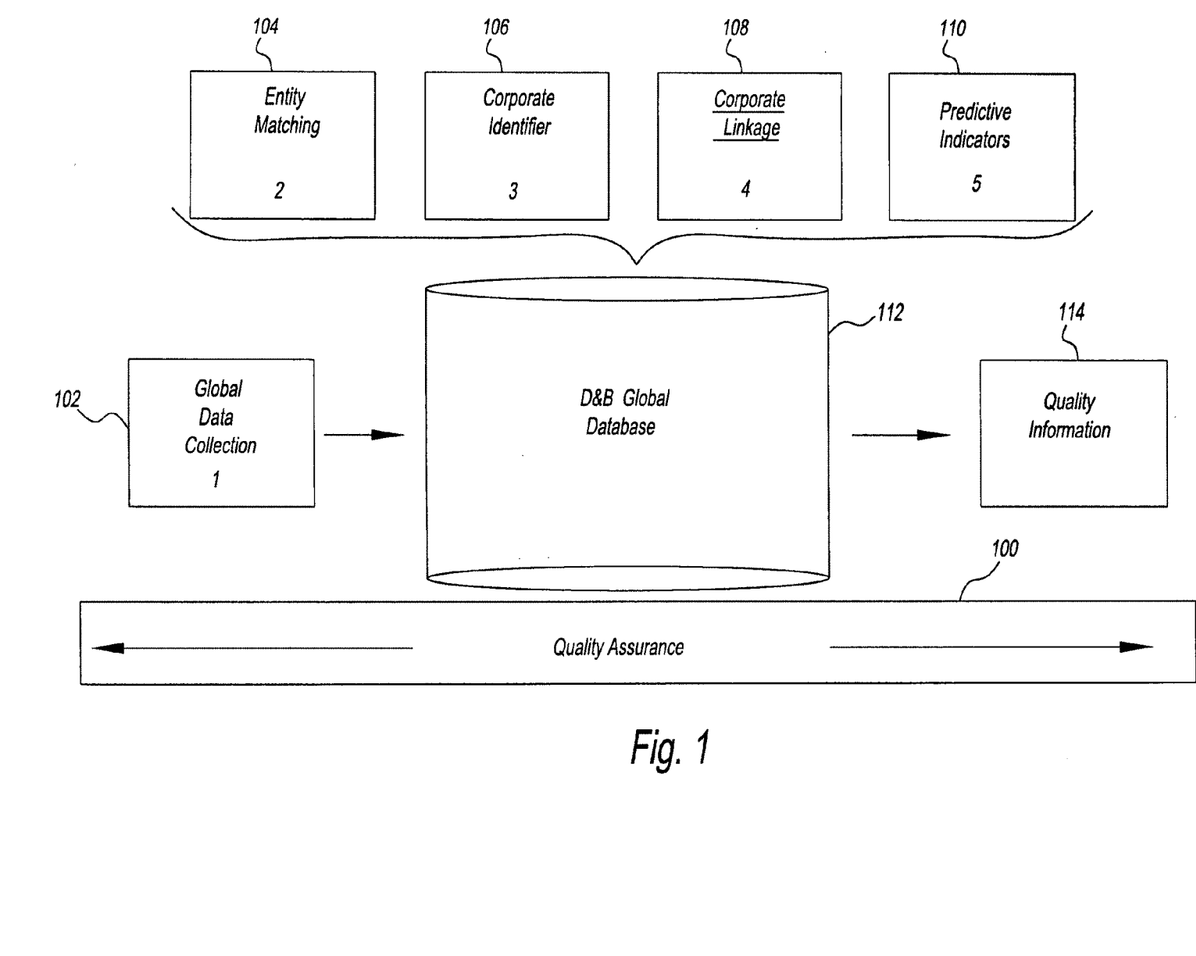
FIG. 1 is a block diagram of an example business information system incorporating a system for linking business entities.

FIG. 1 shows an example business information system incorporating a system for linking business entities. The example business information system is the DUNSRight™ system and process available from Dun & Bradstreet, Short Hills, N.J. The process provides accurate, complete, timely, and globally consistent information by collecting, aggregating, editing, and verifying data from thousands of sources daily to provide business information to customers to make profitable decisions for their businesses. The process includes five drivers and quality assurance 100. The five drivers are: (1) global data collection 102, (2) entity matching 104, (3) corporate identifier 106, such as 0® Number, (4) corporate linkage 108, and (5) predictive indicators 110. Global data collection 102 brings together data from a variety of sources worldwide. The data is integrated into a global database 112 through entity matching 104 and applying a corporate identifier 106 to uniquely identify and track each business. Corporate linkage 108 enables customers to view their total risk or opportunities across related businesses. Predictive indicators 110 uses statistical analysis to rate past performance of a business and indicate how the business is likely to perform in the future. As a result of this process, quality information 114 is provided to the customer.

Corporate linkage 108 uses corporate identifiers to link corporate family structures to help customers understand total corporate risk and opportunity with any given company. Within a corporate family, headquarters, branches, parents and subsidiaries are all viewed in terms of their relationship to other members of the same family tree. Understanding these relationships can help customers aggregate total risk exposures, uncover new selling opportunities, avoid conflict-of-interest situations, negotiate global purchasing agreements, perform merger and market analysis and more.

Figure 2:
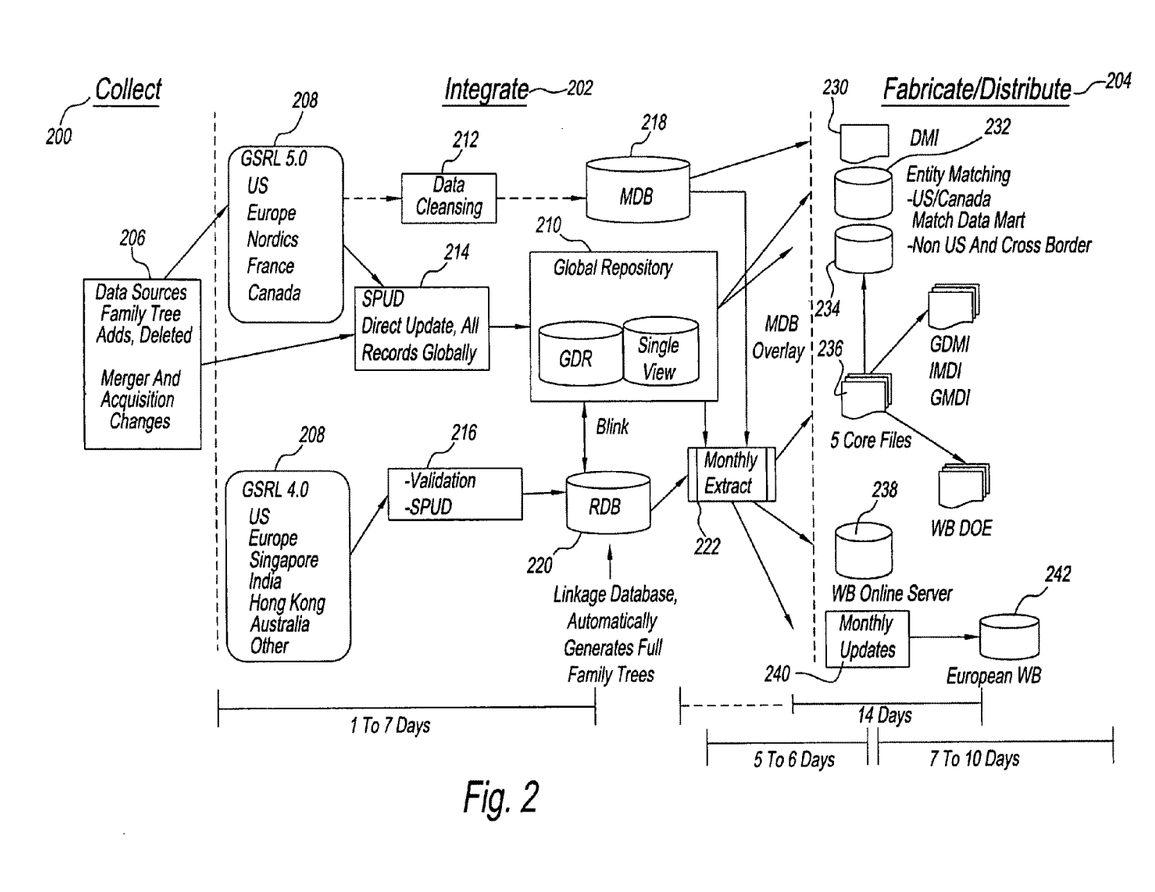
FIG. 2 is a block diagram of an example system for linking business entities.

FIG. 2 shows an example system for linking business entities, such as corporate linkage 108. This system has three associated activities: collect 200, integrate 202, and fabricate or distribute 204. Data is collected 200, integrated with other data 202, and, then, provided as part of data products 204.

Data is collected 200 from various sources 206, resulting in changes to family trees, items to add, items to delete, and corporate changes. Corporate changes include mergers, acquisitions, spin-offs, purchase of assets, sale of assets, and the like. Sources include internal reviews, business investigations, press releases, government records, and the like. In some embodiments, information is gathered by regional coordinators and local representatives and coordinated by a global coordinator. A family tree for an entity includes a corporate headquarters, any subsidiaries that it owns or has a majority stake in and any secondary locations or branches. The family tree shows relationships of ownership through linkage between entities. Entities include corporations, companies, partnerships, governments, non-profits, and other entities. Family tree processes gather corporate linkage updates periodically for both local and global data.

Collected data 200 is integrated 202 with other data. In this example, global standard record layouts (GSRLs) 208 provide formats for data updates from local files throughout the world into a global repository 210. Some data is processed by data cleansing 212. Other data is processed by a specialized update (SPUD) process 214. Other data is validated and then processed by SPUD 216.

Data cleansing 212 standardizes the data and assigns corporate identifiers, including entity matching. Once data is cleansed 212, it is stored in an application database, here a marketing database (MDB) 218.

SPUD 214 updates global business information in a batch environment, without manual intervention for each transaction. SPUD directly updates all records globally in global repository 210. In some embodiments, a batch system updates multiple locations within a corporate family at the same time, globally.

Data is fabricated or distributed 204. A linkage database 220 integrates updates on individual locations into complete new family tree structures in approximately real time. In some embodiments, fully revised family trees are available to customers within 24-48 hours of update. In some embodiments, linkage database 220 is a series of tables that store linkage data and derive corporate family trees from corporate identifier to corporate identifier links.

A monthly extract 222 receives data from MDB 218, global repository 210, and linkage database 220 and provides data for fabrication and distribution 204. Also, MDB 218 and global repository 210 directly provide data for fabrication and distribution. In some embodiments, the extract 222 is done periodically to correspond to data product release schedules that are different from monthly.

In this example, the various ways data is fabricated and distributed 204 includes processing by DUNS Market Identifiers® (DMI) 230, matching 232, using various files 236 and databases 234. Also, there is a WorldBase™ (WB) online server 238 and monthly updates 240 for a European WorldBase (WB) database 242, in this example. DUNS Market Identifiers 230 provides prospecting information to customers. WorldBase is a database storing business information about companies.

In this example, integrating data into databases takes 1 to 7 days, monthly extracts take 5 to 6 days, and fabrication and distribution take between 7 to 10 and 14 days to complete. Timeliness and currency of data are some of the many advantages of the present invention.

Figure 3:
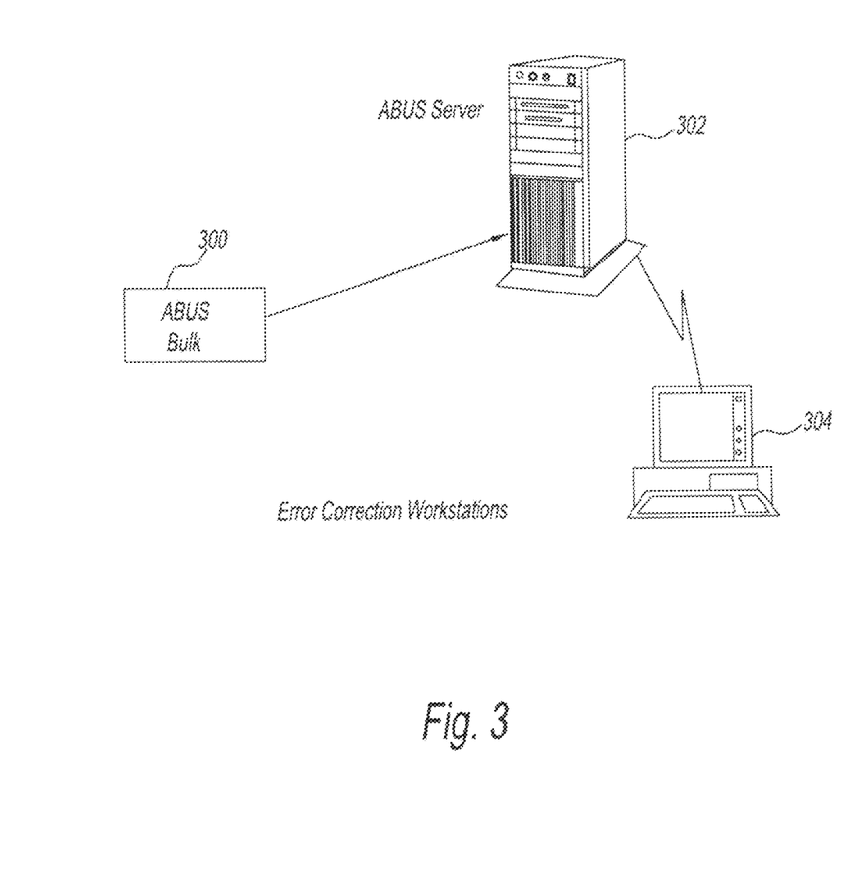
FIG. 3 is a block diagram of an example system for batch updates and error corrections.

FIG. 3 shows an example system for batch updates and error corrections. In this example, an automated batch update system (ABUS) 300 runs on a server 302 to update United States businesses in a batch environment without manual intervention for each transaction. An information consultant workstation (ICW) 304 is a toolkit used to update United States businesses one transaction at a time to, for example, correct errors.

Figure 4:
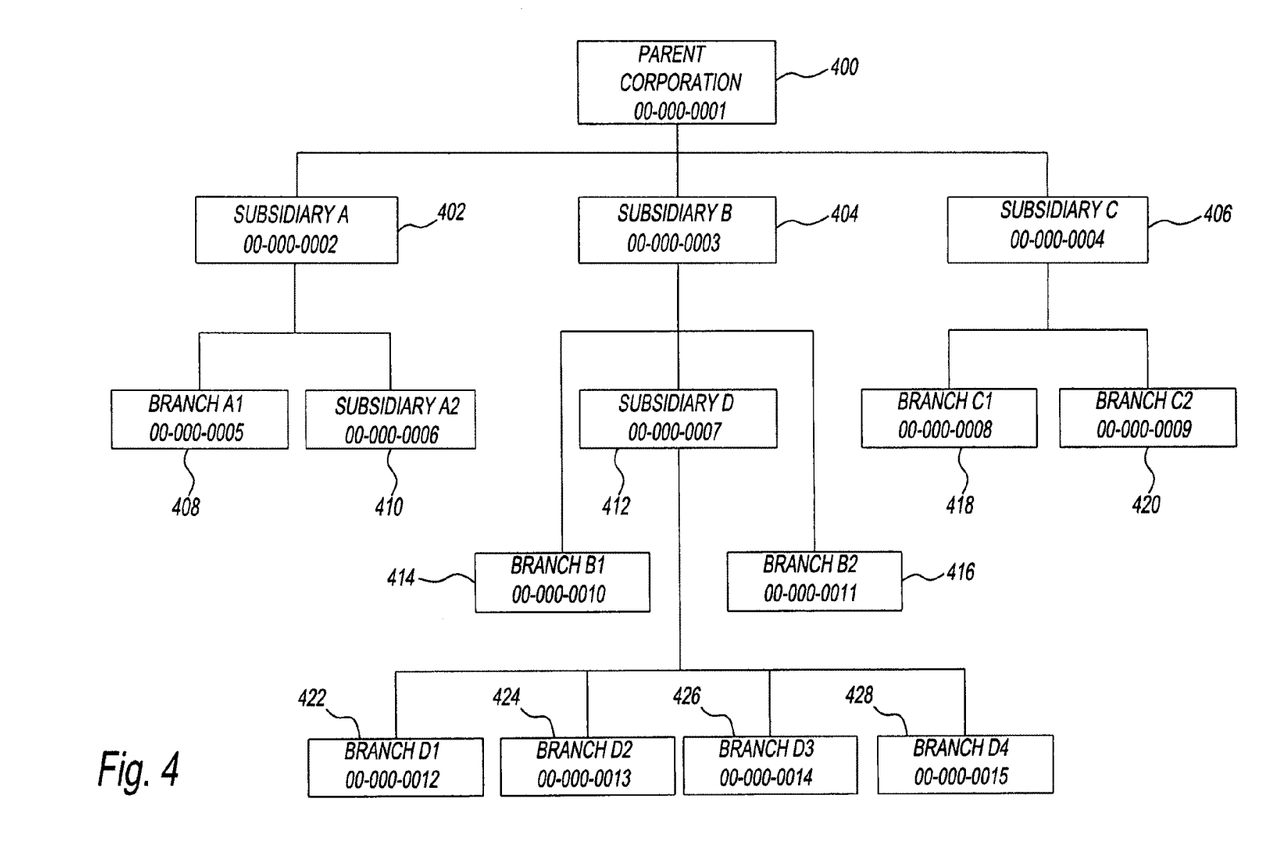
FIG. 4 is a block diagram of an example family tree created by a system for linking business entities.

FIG. 4 shows an example family tree created by a system for linking business entities. A parent corporation 400 has three subsidiaries, subsidiary A 402, subsidiary B 404, and subsidiary C 406. Subsidiary A 402 has two branches, branch A1 408 and branch A2 410. Subsidiary B 404 has subsidiary D 412, and two branches, branch B1 414 and branch B2 416. Subsidiary C 406 has two branches, branch C1 418 and branch C2 420. Subsidiary D has four branches, branch D1 422, branch D2 424, branch D3 426, and branch D4 428. In some embodiments, each family tree has at least one person responsible for its maintenance and quality.

In general, linkage is the relationship between different companies or specific sites within a corporate family. Linkage occurs in a database when one business location has financial and legal responsibility for another business location. There are at least two types of linkage relationships branch to headquarter linkage and subsidiary to parent linkage. There are other types of family relationships that occur which are not linked in a file, because the affiliated company has no legal obligation for the debts of the other company. Examples of these types of relationships include businesses affiliated through common officers or situations where one corporation owns a part or minority interest in another (50% or less) and joint ventures, where there is a 50/50 split in the ownership.

In one example, there are 8 classifications of businesses: (1) single location subsidiary, (2) headquarters, (3) branch, (4) division, (5) subsidiary, (6) parent, (7) domestic ultimate, and (8) global ultimate.

A single location subsidiary has a parent which owns more than 50% of its capital stock; however, it does not have branches or subsidiaries reporting to it. This is different from a stand-alone business, which is not part of a corporate family.

A headquarters is a business establishment that has branches or divisions reporting to it and it is financially responsible for those branches or divisions. If the headquarters has more than 50% of capital stock owned by another corporation, it also will be a subsidiary. If it owns more than 50% of capital stock of another corporation, then it is also a parent.

A branch is a secondary location of its headquarters. It is not a separate corporation and has no legal responsibility for its debts, even though bills may be paid from the branch location. It usually has the same legal business name as its headquarters, although branches frequently operate under a different trade style than the headquarters establishment. A branch may be located at the same address as the headquarters, if it has a unique trade style and unique or distinct operations.

A division, like a branch, is a secondary location of a business. However, a division carries out specific business operations related to the headquarters under a divisional name. Divisions look similar to branches in a database and have a branch code.

A subsidiary is a corporation whose capital stock is more than 50% owned by another corporation and has a different legal business name from its parent company. A subsidiary may have branches and/or subsidiaries of its own. If it does, then its corporate identifier appears in a headquarter/parent field of its children.

A parent is a corporation that owns more than 50% of another corporation's capital stock. The parent company may also be a subsidiary of another corporation. If the parent also has branches, then it is a headquarters as well as being a parent company.

A domestic ultimate is an entity within the global family tree that is the highest ranking member within a specific country. There can be several domestic ultimates within a given country for one corporate family, each in separate limbs or nodes of a corporate family tree.

A global ultimate is the top most responsible entity within the global family tree. The global ultimate may have branches and/or subsidiaries reporting directly or indirectly to it.

Figure 5:
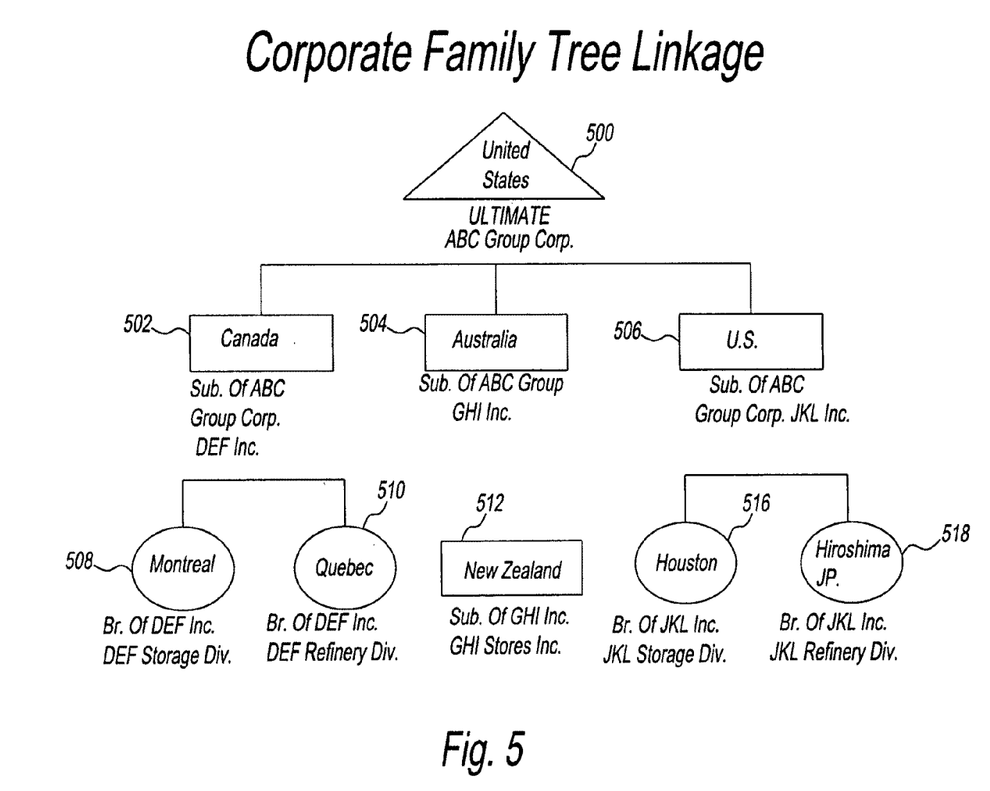
FIG. 5 is a block diagram of another example family tree created by a system for linking business entities.

FIG. 5 shows another example family tree created by a system for linking business entities. In this example, there is a family tree with a domestic ultimate named ABC Group Corp 500 in the United States that has three subsidiaries, DEF Inc. 502 in Canada, GHI Inc. 504 in Australia, and JLK Inc. 506 in the United States. DEF Inc. 502 has two branches, DEF Storage Div. 508 in Montreal and DEF Refinery Div. 510 in Quebec. GHI Inc. has a subsidiary named GHI Stores Inc. 512 in New Zealand. JKL Inc. 506 has two branches, JKL Storage Div. 516 in Houston and JKL Refinery Div. 518 in Hiroshima, Japan.

Figure 6:
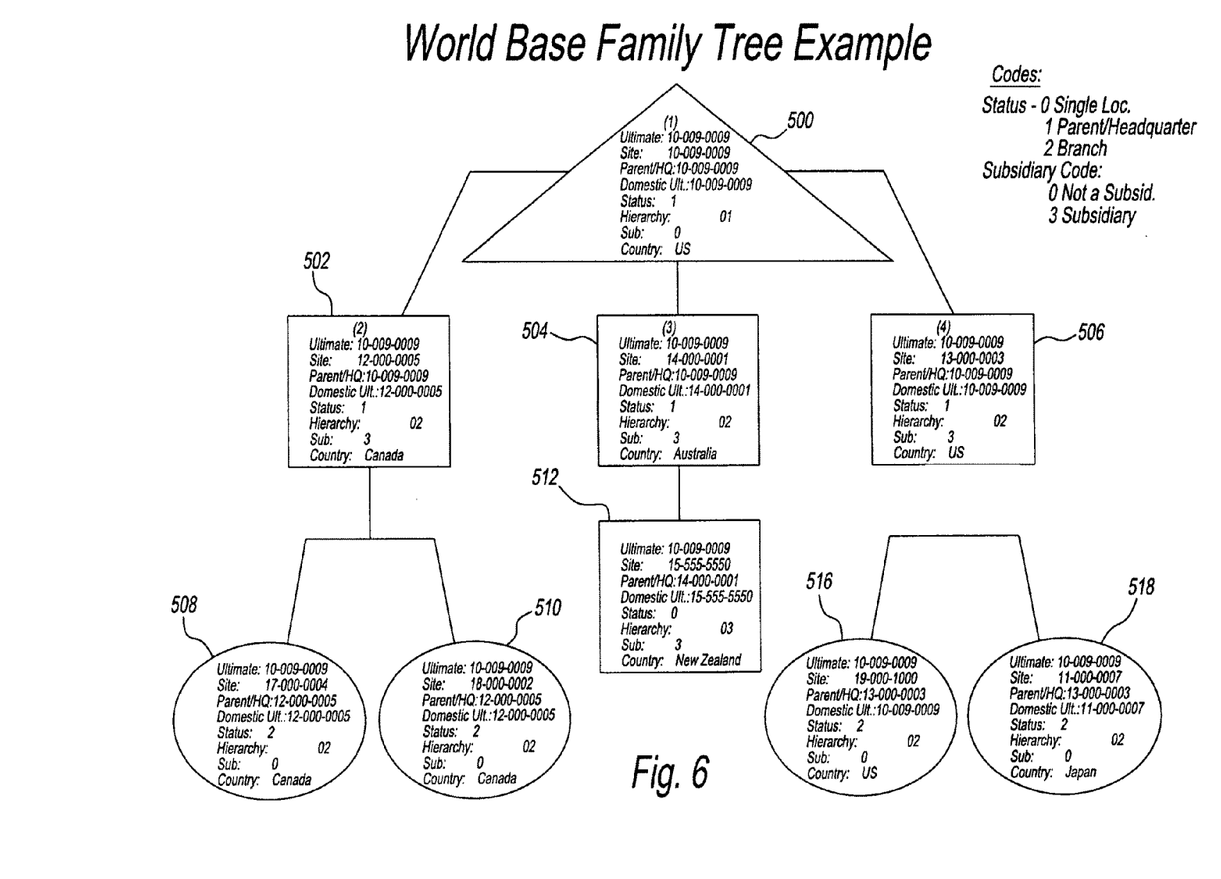
FIG. 6 is a block diagram of an example database record structure corresponding to the example family tree in FIG. 5.

FIG. 6 shows an example database record structure corresponding to the example family tree in FIG. 5. In this example, for the purposes of linking these relationships to define corporate responsibility, each family member carries up to four corporate identifiers: (1) its own (site corporate identifier), (2) that of the next highest level in the family (parent or headquarter corporate identifier), (3) that of the highest level within its country (domestic ultimate corporate identifier), and (4) that of its top global ultimate (global ultimate corporate identifier).

In this example, the branch carries its own corporate identifier, that of its headquarters, that of its domestic ultimate, and that of its global ultimate. A subsidiary carries its own corporate identifier, that of its parent, that of its domestic ultimate, and that of its global ultimate. For branch JLK Refinery Div. 518 in FIG. 6, (1) its own corporate identifier is 11-000-0007, (2) that of the next highest level is 13-000-0003 (JLK Inc. 506), (3) that of the highest level within its country is 11-000-0007 (it is the only entity in Japan in this family tree), and (4) that of its top global ultimate is 10-009-0009 (ABC Group Corp. 500).

In this example, the domestic ultimate is the highest member of the family tree in a specific country. The site corporate identifier and domestic ultimate corporate identifier are all the same on the domestic ultimate record. For the domestic ultimate in FIG. 6, ABC Group Corp 500, (1) its own corporate identifier, (2) that of the next highest level, (3) that of the highest level within its country and (4) that of its top global ultimate are all the same: 10-009-0009.

In this example, the global ultimate record carries the same corporate identifier in the site corporate identifier field, the headquarters/parent corporate identifier field, the domestic ultimate corporate identifier, and the global ultimate corporate identifier field. This business is at the very top of the global family tree. In FIG. 6, ABC Group Corp. 500 is also the global ultimate.

In this example, each record carries a set of linkage elements that help identify the type of record it is as well as its relationship to other records in the family tree. They are the status code, subsidiary code, hierarchy code, dias code, and global ultimate corporate identifier.

In this example, the status code is a one-digit field that identifies a record as a single location (0), headquarters (1), or branch (2). The subsidiary code is a one-digit field that identifies the record as a subsidiary (3) or non-subsidiary (0). In FIG. 6, ABC Group Corp. 500 has a status code of 1, JKL Refinery Div. 518 has a status code of 2, and GHI Inc. 512 has a subsidiary code of 3.

In this example, the hierarchy code is a two-digit field that determines the record's relative position in a family tree indicating its relationship to other records. The hierarchy code functions in the following way. Global ultimates have a hierarchy code of 01. Subsidiaries have a hierarchy code of one greater than their parent's hierarchy code. Branches have a hierarchy code equal to their headquarter's hierarchy code. In FIG. 6, ABC Group Corp. 500 has a hierarchy code of 01, its three subsidiaries, DEF Inc. 502, GHI Inc. 504, and JKL Inc. 506 all have a hierarchy code of 02. The subsidiary of GHI Inc. 504 is GHI Stores Inc. 512 and it has a hierarchy code of 03.

In this example, the dias code is a nine-digit field which sorts a corporate family tree into family sequence. The dias code changes each time the linkage file is updated. In general terms, all branches are listed directly below their headquarters, while subsidiaries are listed directly under their parents. In a situation where a parent/headquarters has both branches and subsidiaries reporting to it, the branches are listed first, followed by the subsidiaries. Branches are sorted alphabetically by country, while subsidiaries are sorted alphabetically by company name. Periodically, when a new file is created, the dias code is recalculated to reflect updates made to the trees.

In this example, a global ultimate company is identified when the site identifier corporate identifier is the same as the global ultimate corporate identifier and the hierarchy code equals "01". There is also a global ultimate indicator, "Y".

In this example, most businesses in the database are stand-alone businesses and, thus, not linked. Stand-alone businesses are entities which do not have any linkage relationships, e.g. headquarter, parent, branches, or subsidiaries. There is only one location. Table 1 shows an example stand-alone business record.

TABLE 1

A Stand-Alone Business Record

| Site DUNS Number | Status Code | Sub Code | HQ/PAR DUNS | Domestic Ult. DUNS | Global Ultimate DUNS | Hierarchy Code | Dias CODE | Definition |
|---|---|---|---|---|---|---|---|---|
| 111111111 | 0 | 0 or blank | Blank or populated with the case DUNS | Blank or populated with the case DUNS | Blank or populated with the case DUNS | Blank | Blank | Stand-alone business, not part of a family tree |

Figure 7:
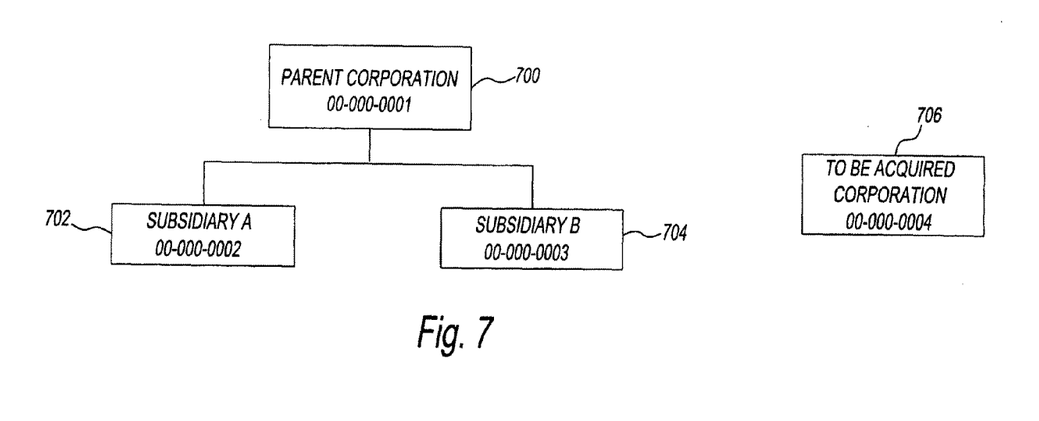
FIG. 7 is a block diagram of two example family trees prior to an acquisition.
Figure 8:
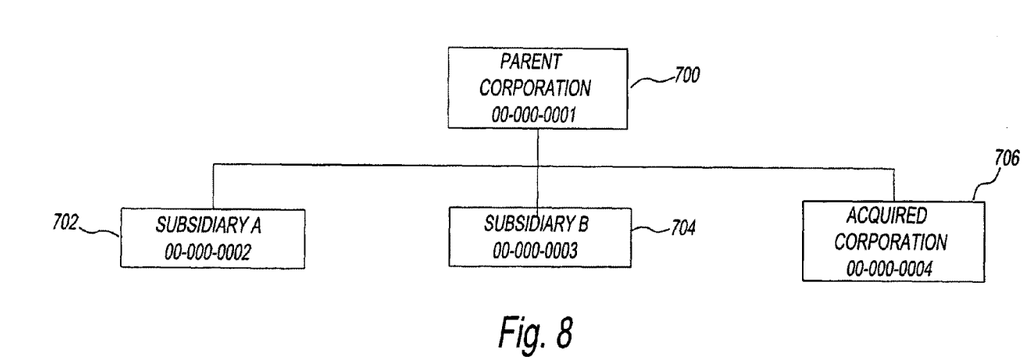
FIG. 8 is a block diagram of linkage after one family tree acquires another.

FIGS. 7 and 8 show two example family trees before and after an acquisition. FIG. 7 shows the linkage of the two family trees prior to an acquisition and FIG. 8 shows the linkage after one family tree acquires another. In FIG. 7, a parent corporation 700 having two subsidiaries, subsidiary A 702 and subsidiary B 704 and a to be acquired corporation 706 each have separate family trees. After the acquisition is processed the two trees are one as shown in FIG. 8. The acquired corporation 706 is linked to the family tree under parent corporation 700. If a corporate family is acquired, rather than just a single site, using the DUNS Number key, changes to a corporate family are cascaded to all corporate family members immediately in the linkage database. The global ultimate for all corporate family members in the acquired company is changed to the global ultimate of the acquiring company.

Figure 9:
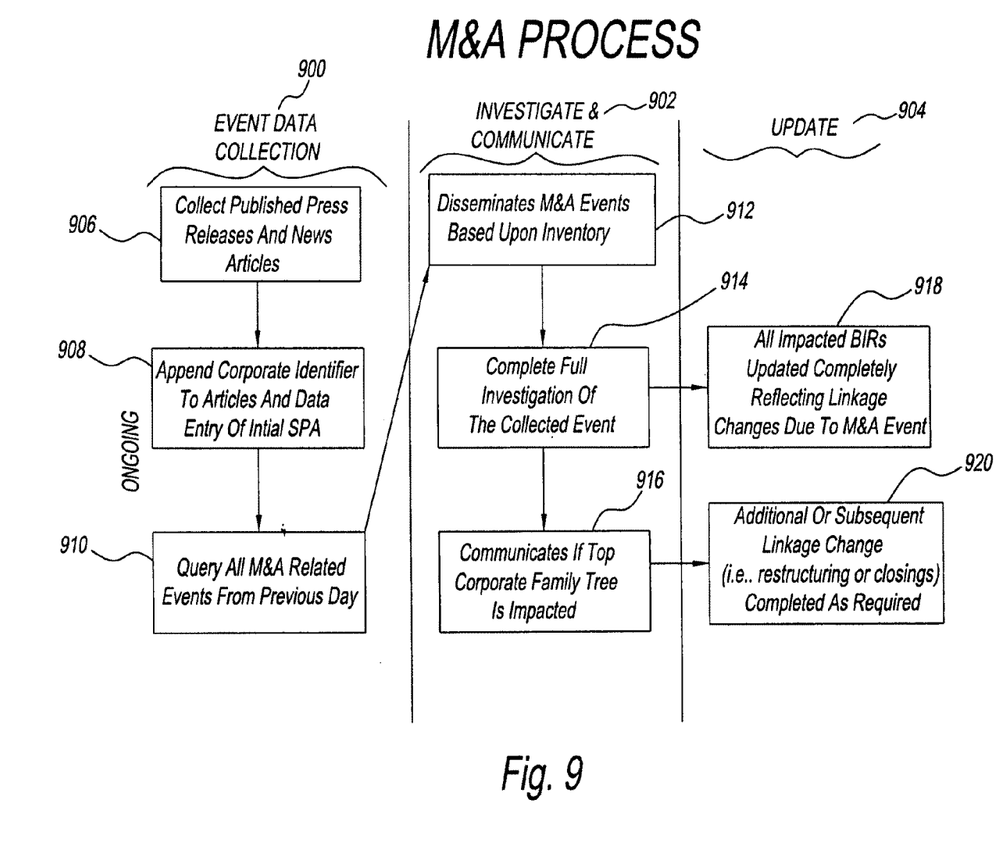
FIG. 9 is a logic flow diagram of an example corporate change process for updating family trees.

FIG. 9 shows an example corporate change process for updating family trees. This example process is divided into three categories: event data collection 900, investigate and communicate 902, and update 904. These sections operate in parallel in some embodiments.

Under category event data collection 900, published press releases and news articles are collected 906. In step 908, corporate identifiers are appended to articles and data entry is performed. In step 910, all events related to mergers and acquisitions from the previous day are queried and forwarded to a team leader.

Under category investigate and communicate 902, the team leader disseminates the merger and acquisition events to a team based upon inventory 912. In step 914, the team members complete a full investigation of the collected event. In step 916, the team communicates with others when a top corporate family tree is impacted.

Under category update 904, after step 914, all impacted business information reports (BIRs) are updated, reflecting linkage changes due to the merger and acquisition event 918. After step 916, additional or subsequent linkage changes, i.e., restructuring or closing, are completed as needed 920.

Figure 10:
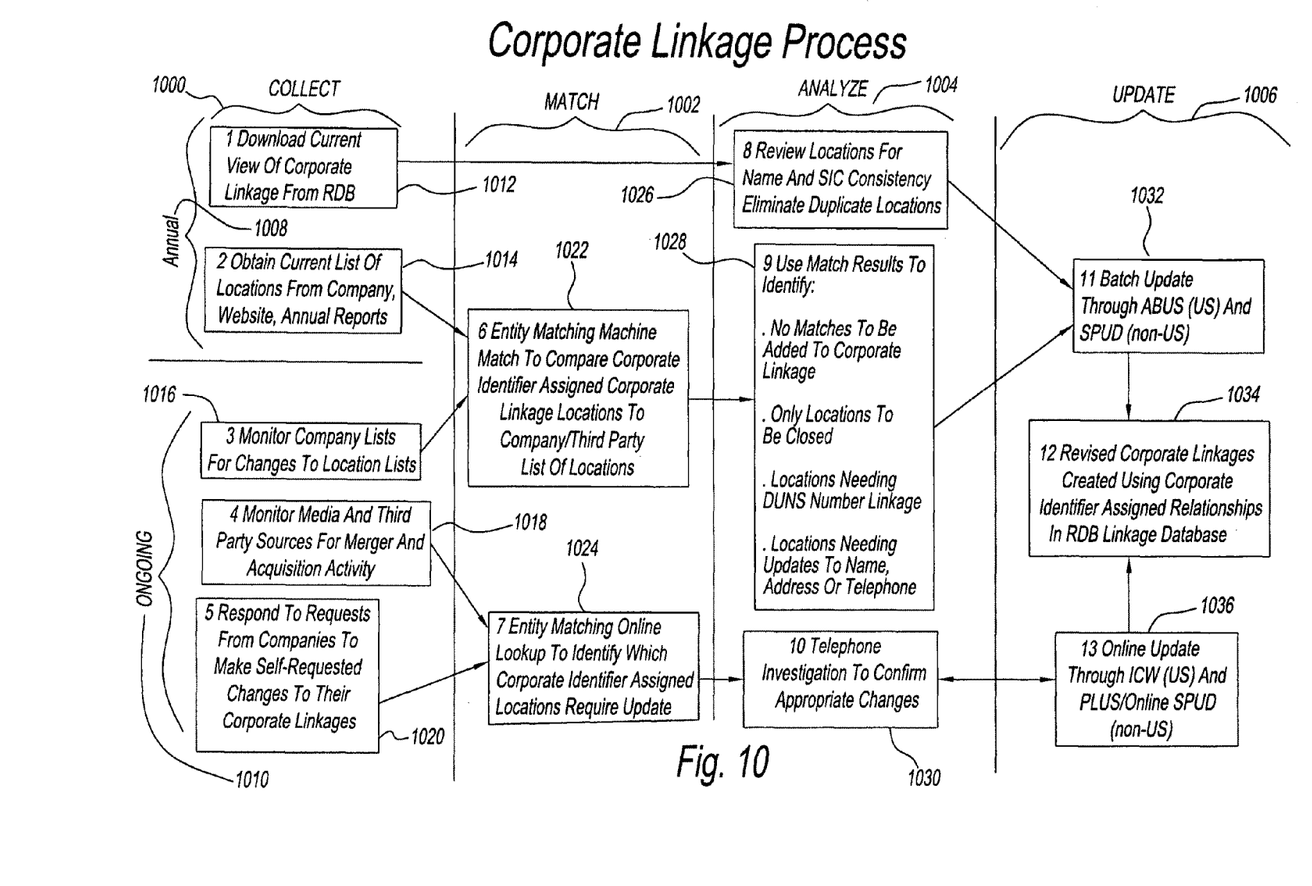
FIG. 10 is a logic flow diagram of an example corporate linkage process for maintaining family trees.

FIG. 10 shows an example corporate linkage process for maintaining family trees. This example process has four categories: collect 1000, match 1002, analyze 1004, and update 1006. Under category collect 1000, there are two subcategories: annual 1008 and ongoing 1010 processes. In FIG. 10, arrows show control and data flow between steps.

Under category collect 1000, in step 1012, a current view of corporate linkage is downloaded from a database. In step 1014, a current list of locations is obtained from various sources, such as the company itself, a website, and annual reports. In step 1016, company lists are monitored for changes to location lists. In step 1018, media and third party sources are monitored for merger and acquisition activity. In step 1020, a response is made to requests from companies to make self-requested corporate changes to their corporate linkages.

Under category match 1002, in step 1022, an entity matching process compares corporate identifier assigned corporate linkage locations to company or third party lists of locations. In step 1024, the entity matching process performs an online lookup to identify which corporate identifier assigned locations need to be updated. In step 1026, locations are reviewed for name and standard industry classification (SIC) consistency and duplication locations are eliminated. In step 1028, match results are used to identify the following: (1) no matches to be added to corporate linkage, (2) locations to be closed, (3) locations needing corporate identifier linkage, and (4) locations needing updates to name, address, or telephone information. In step 1030, a telephone investigation is conducted to confirm appropriate changes.

Under category update 1006, in step 1032, a batch update is performed through an automated batch update system (ABUS) for United States updates and through a specialized update system (SPUD) for other updates. SPUD updates global businesses in a batch environment, without manual intervention for each transaction. In step 1034, corporate linkages created using corporate identifier assigned relationships are revised in a linkage database. In step 1036, online updates are performed through an information consultant workstation (ICW) for United States updates and through a priority linkage update system (PLUS/Online SPUD) for other updates. ICW is used to updated United States businesses one transaction at a time. PLUS is used to update global businesses in a database one transaction at a time.

In this example, linkage data in a database is obtained in at least two ways. First, a top-down review is performed around the world, starting in the country in which an ultimate parent company resides. An analyst contacts a knowledgeable source at the ultimate parent company or one of its high-level subsidiaries to ascertain the proper family tree structure. Local and global data updates are coordinated so that they are consistent and accurate for domestic data in the host country's file, the cross-border subsidiary information in global family tree, and local files. In some embodiments, the top trees are reviewed annually. Top trees are a pre-defined number of the largest, most globally active businesses in the world. For example, the top 5,000 multinational companies that trade with each other or are competitors, which make up about 98% of all transactions.

In this example, a second way data is obtained is by bottom-up linkage or host linkage. This is a process where a subsidiary/parent company or a branch/headquarters linkage is collected at the country level during normal revision and/or updating processes. This data is then processed into a relational database-global repository of all global marketing data (RDB).

It is to be understood that the above description is intended to be illustrative and not restrictive. Many other embodiments will be apparent to those of skill in the art upon reviewing the above description, such as adaptations of the present disclosure to linking government, nonprofit, or other kinds of entities. Various designs using hardware, software, and firmware are contemplated by the present disclosure, even though some minor elements would need to change to better support the environments common to such systems and methods. The present disclosure has applicability to various services, computer systems, and user interfaces beyond the example embodiments described, such as various database management systems, enterprise systems, and user interface systems. Therefore, the scope of the present disclosure should be determined with reference to the appended claims, along with the full scope of equivalents to which such claims are entitled.

What is claimed is:

1. A method that is performed by a computer, comprising:
    obtaining a first list of data that describes (a) corporate linking relationships between a plurality of business entities and (b) a business location for each of said plurality of business entities, wherein said first list is obtained from a source selected from the group consisting of the business entity itself, a website, and an annual report;
    for each business entity in said plurality of business entities, matching said business entity to an identifier that uniquely identifies said business entity, thus yielding a plurality of identifiers;
    comparing by said computer said first list to a list of corporate identifier assigned corporate linkage locations that represents business locations of business entities in a family tree in a database, by using said plurality of identifiers to identify members of said family tree;
    updating linking for said family tree in said database, from said data that describes said corporate linking relationships;
    monitoring said family tree and identifying a change in said business location of said business entity, wherein said change in said business location is a change to at least one datum selected from the group consisting of business entity name, business entity address and business entity telephone information; and
    updating said database for said change in said business location, from said data that describes said business location for each of said plurality of business entities.

2. A system for linking business entities, comprising:
    a database;
    a computer; and
    a machine-readable medium that contains instructions that cause said computer to:
        obtain a first list of data that describes (a) corporate linking relationships between a plurality of business entities and (b) a business location for each of said plurality of business entities, wherein said first list is obtained from a source selected from the group consisting of the business entity itself, a website, and an annual report;
        for each business entity in said plurality of business entities, match said business entity to an identifier that uniquely identifies said business entity, thus yielding a plurality of identifiers;
        compare said first list to a list of corporate identifier assigned corporate linkage locations that represents business locations of business entities in a family tree in a database, by using said plurality of identifiers to identify members of said family tree;
        update linking for said family tree in said database, from said data that describes said corporate linking relationships;
        monitor said family tree and identify a change in said business location of said business entity, wherein said change in said business location is a change to at least one datum selected from the group consisting of business entity name, business entity address and business entity telephone information; and
        update said database for said change in said business location, from said data that describes said business location for each of said plurality of business entities.

3. A machine-readable medium having instructions stored thereon to perform a method of linking business entities, said method comprising:
    obtaining a first list of data that describes (a) corporate linking relationships between a plurality of business entities and (b) a business location for each of said plurality of business entities, wherein said first list is obtained from a source selected from the group consisting of the business entity itself, a website, and an annual report;
    for each business entity in said plurality of business entities, matching said business entity to an identifier that uniquely identifies said business entity, thus yielding a plurality of identifiers;
    comparing said first list to a list of corporate identifier assigned corporate linkage locations that represents business locations of business entities in a family tree in a database, by using said plurality of identifiers to identify members of said family tree;
    updating linking for said family tree in said database, from said data that describes said corporate linking relationships;
    monitoring said family tree and identifying a change in said business location of said business entity, wherein said change in said business location is a change to at least one datum selected from the group consisting of business entity name, business entity address and business entity telephone information; and
    updating said database for said change in said business location, from said data that describes said business location for each of said plurality of business entities.

* * * * *